US012783052B2

(12) United States Patent
Huang

(10) Patent No.: US 12,783,052 B2
(45) Date of Patent: Nov. 3, 2026

(54) HAPTIC-FEEDBACK BILATERAL HUMAN-MACHINE INTERACTION METHOD BASED ON REMOTE DIGITAL INTERACTION

(71) Applicant: Rui Huang, Shenzhen (CN)

(72) Inventor: Rui Huang, Shenzhen (CN)

( * ) Notice: Subject to any disclaimer, the term of this patent is extended or adjusted under 35 U.S.C. 154(b) by 0 days.

(21) Appl. No.: 18/338,745

(22) Filed: Jun. 21, 2023

(65) Prior Publication Data

US 2024/0085982 A1 Mar. 14, 2024

(30) Foreign Application Priority Data

Sep. 9, 2022 (CN) ......................... 202211101555.6

(51) Int. Cl.
*G06F 3/01* (2006.01)
*G06F 3/0488* (2022.01)
*G10L 15/18* (2013.01)

(52) U.S. Cl.
CPC ............ *G06F 3/016* (2013.01); *G06F 3/0488* (2013.01); *G10L 15/1815* (2013.01)

(58) Field of Classification Search
CPC .. G06F 3/016; G06F 3/0488; G06F 2203/011; G06F 3/011; G06F 3/017; G06F 3/015
USPC .......................................................... 715/702
See application file for complete search history.

(56) References Cited

U.S. PATENT DOCUMENTS

| | | | | | |
|---|---|---|---|---|---|
| 5,027,407 | A * | 6/1991 | Tsunoda | G10L 15/10 | 704/239 |
| 2004/0083101 | A1* | 4/2004 | Brown | G10L 15/26 | 704/235 |
| 2013/0154814 | A1* | 6/2013 | Pance | G06F 3/016 | 340/407.2 |
| 2014/0143784 | A1* | 5/2014 | Mistry | G06F 3/0488 | 718/102 |
| 2016/0378186 | A1* | 12/2016 | Kim | G06F 3/016 | 345/156 |
| 2017/0153702 | A1* | 6/2017 | Abrahams | G06F 16/29 | |

(Continued)

OTHER PUBLICATIONS

Sfuptownmaker. "I2C—Learn.sparkfun.com." Sparkfun.com, 2018, learn.sparkfun.com/tutorials/i2c/all. (Year: 2018).*

*Primary Examiner* — Stephen S Hong
*Assistant Examiner* — Broderick C Anderson

(57) ABSTRACT

A haptic-feedback bilateral human-machine interaction method that enables the physicalization of remote digital interaction, which comprises three input methods S1, S2, S3, and one output and interaction implementation method S4. Compared to the prior arts, the invention has the following advantages: the solution is a dual-layers interface, comprising of a haptic-based tangible layer and an audio channel, through which introduces tactile and kinesthetic feedback into remote communication and translates gestures, facial expressions, tone of voice, and other tangible stimuli into haptic representations to augment the communication of emotions, feelings, semantics, and contextual meanings of the conversations. This dual-layers system forms a real-time two-way feedback loop that communicates audio as well as tactile and kinesthetic stimulations, which helps and augments people to comprehend the semantics, meanings, and contexts of the audio content or the conversation.

5 Claims, 4 Drawing Sheets

(56) References Cited

U.S. PATENT DOCUMENTS

| | | | | |
|---|---|---|---|---|
| 2017/0344116 | A1* | 11/2017 | You | G06F 3/016 |
| 2022/0132194 | A1* | 4/2022 | Aimone | H04N 21/4788 |
| 2024/0061505 | A1* | 2/2024 | Li | G06F 3/016 |

* cited by examiner

HAPTIC-FEEDBACK BILATERAL HUMAN-MACHINE INTERACTION METHOD BASED ON REMOTE DIGITAL INTERACTION

1. TECHNICAL FIELD

The invention relates to the technology that enables the physicalization of remote digital interactions, in particular to a haptic-feedback bilateral human-computer interaction method that incorporates a tangible user interface and an interaction method.

2. BACKGROUND ART

Advancement in science and engineering has brought prosperities to the development of technologies that blend the virtual and digital cyberspace with the physical world, like digital media, and virtual-, mixed-, and augmented-reality. Interaction with the external world and communication with one another has shifted from being entirely physical to being more remote and virtual based, expanding beyond the physical existence. The world is in transition to a hyper-digital lifestyle with remote living and working becoming the new norm. However, existing communication devices, voice playback devices, or computing devices that incorporates input and output can only transmit audio and digital information, which is intangible. In face-to-face communication or in-person interaction between people, audio or single layer stimulus can only be regarded as a fraction of the multimodal human senses. Gesture, body movements, facial expressions, tone of voice, emotions, and other forms of sensory information or stimuli are also essential to the comprehension of contextual meaning and semantics of the conversation. The current human-machine interaction model neglects tactile sensation substantially and has impacted our wellbeing. Findings suggest depression, anxiety, PTSD, mental and secondary immune disorders have increased by up to 40% as a result of touch and tactile deprivation. Therefore, intelligent wearable devices need to compensate for the loss of physical interaction in digital communication, and to reintroduce tangible interaction, in particular haptic feedback, to enhance the comprehension of contextual meaning and semantics of the conversation, and to augment the communication of emotions as well as other multimodal human senses.

3. SUMMARY OF THE INVENTION

The technical problem to be solved by the invention is to transform the existing virtual based human machine interaction model, which neglects tactile sensation and physical interaction substantially, to incorporate a new tangible medium that can stimulate multimodal human senses for affective haptic communication in digital contexts, and to transcend the physical boundaries between users in their daily communication.

To solve the above technical problems, the invention offers the following technical solutions: a haptic-feedback bilateral human-machine interaction method that physicalize digital interactions, and the invention comprises three input methods S1, S2, and S3, and one output and interaction implementation method S4, wherein specifically comprises:

S1. Touch Recognition

S1.1. To start, users input touch, gestures, or physical movements (including but not limited to touch, slide, swipe, tap, pat, or any other forms of physical inputs) on a touch-responsive surface that consists of electric-inducted materials;

S1.2. Physical inputs, captured as the pressure-proportional analogue signals, are then being converted into electric signals in the forms of changes of capacitance, resistance, or magnetics;

S1.3. The converted electrical signals are further processed and converted into a series of two- or three-dimensional coordinate data;

S1.4. The processor analyzes, parse, and then map the series of electrical signals and coordinate data to generate a series of interaction commands;

S1.5. Interaction commands are transmitted to the CPU through a built-in integrated circuit (12C interface), and are uploaded to the haptic, tactile, and kinesthetic-based semantic database, which is on the cloud, or alternatively stored within the storage unit in the device control system; Physiological information is also captured by biosensors, which includes but not limited to PPG heart rated sensor, or EEG brain wave sensors, and synchronized to the haptic, tactile, and kinesthetic-based semantic database to enhance the recognition of the interaction commands, contexts, and user status and emotions;

S1.6. The semantic database then translates and maps the interaction commands to the corresponding haptic, tactile, or kinesthetic representations, with the contextual semantic recognition of emotions, feelings and actions.

S2. Gesture Recognition

S2.1. To start: users input gestures, physical movements, or interaction information (including but not limited to touch, slide, swipe, tap, pat, or any other forms of interaction inputs) within the gesture sensing area;

S2.2. The inductive sensing units in the gesture recognition module (including but not limited to camera vision recognition system, infrared, LiDAR, proximity sensor, magnetic sensor, or ultrasonic motion sensor) continuously capture the three-dimensional positions of the dynamic gestures, and convert them into corresponding 3D coordinate locations and data series;

S2.3. The gesture recognition unit parses the dynamically changing three-dimensional coordinate information into dynamic gestures; the processor analyzes, parse, and then map the series of dynamic gestures and coordinate data to generate a series of interaction commands;

S2.4. Interaction commands are transmitted to the CPU through a built-in integrated circuit (12C interface), and are uploaded to the haptic, tactile, and kinesthetic-based semantic database, which is on the cloud, or alternatively stored within the storage unit in the device control system;

Physiological information is also captured by biosensors, which includes but not limited to PPG heart rated sensor, or EEG brain wave sensors, and is synchronized to the haptic, tactile, and kinesthetic-based semantic database to enhance the recognition of the interaction commands, contexts, and user status and emotions;

S2.5. The semantic database then translates and maps the interaction commands to the corresponding haptic, tactile, or kinesthetic representations, with the contextual semantic recognition of emotions, feelings and actions.

S3. Voice Recognition

S3.1. Users speak and input audio signals, or the CPU processor acquires audio sources through the wireless communication module;

S3.2. The speech recognition module performs acoustic filtration of the audio source to obtain pre-processed audio; analogue signals of the pre-processed audio are then filtered and converted into digital audio signals by an analogue convertor;

S3.3. The converted digital audio signals are parsed and translated into text inputs, which are then intercepted as context, instructions, or commands by the processor, as well as being processed through contextual semantic recognition of emotions, feelings and actions;

S3.4. The processor analyzes, parse, and map the text inputs and the contextual semantic information to a series of interaction commands;

S3.5 Interaction commands are transmitted to the CPU through a built-in integrated circuit (12C interface), and are uploaded to the haptic, tactile, and kinesthetic-based semantic database, which is on the cloud, or alternatively stored within the storage unit in the device control system; Physiological information is also captured by biosensors, which includes but not limited to PPG heart rated sensor, or EEG brain wave sensors, and is synchronized to the haptic, tactile, and kinesthetic-based semantic database to enhance the recognition of the interaction commands, contexts, and user status and emotions;

S3.6 The semantic database then translates and maps the interaction commands to the corresponding haptic, tactile, or kinesthetic representations, with the contextual semantic recognition of emotions, feelings and actions.

S4. Interaction

S4.1. To start: The haptic, tactile, and kinesthetic-based semantic database translates and maps the interaction commands to the corresponding haptic, tactile, or kinesthetic representations, with the contextual semantic recognition of emotions, feelings and actions;

S4.2. The haptic, tactile and kinesthetic feedback and representation signals are downloaded to the CPU and storage unit via wireless communication modules, or are transmitted to through a built-in integrated circuit (12C interface);

S4.3. The CPU processes and interprets the haptic, tactile and kinesthetic feedback signals (including but not limited to vibration frequencies, vibration intensities, vibration intervals, vibration sequence in between an array of vibrational actuators, kinesthetic movements) into output signals, and to be applied to an array of haptic and kinesthetic feedback actuators;

S4.4. The haptic and kinesthetic feedback signals provide haptic and kinesthetic stimulation through the activation of the haptic and kinesthetic feedback actuators within the wearable device;

S4.5. Since the wearable device is in direct contact with human skin, haptic and kinesthetic stimulation can be directly perceived by the user;

S4.6. Users recognize corresponding touch, gestures, activities, or any other forms of physical interaction by perceiving different vibration frequencies, vibration intensities, vibrational interval times and the sequence of vibrations between the modules, achieving the effect of physicalizing digital interaction, achieving the effect of physicalization of the digital interactions, perceiving the physical inputs from other users; and concluding the interaction process.

Compared to the prior arts, the invention has the following advantages: the solution is a dual-layers interface, comprising of a haptic-based tangible layer and an audio channel, through which introduces tactile and kinesthetic feedback into remote communication and translates gestures, facial expressions, tone of voice, and other tangible stimuli into haptic representations to augment the communication of emotions, feelings, semantics, and contextual meanings of the conversations. This dual-layers system forms a real-time two-way feedback loop that communicates audio as well as tactile and kinesthetic stimulations, which helps and augments people to comprehend the semantics, meanings, and contexts of the audio content or the conversation. The interface also incorporates a touch responsive panel that enables users to directly send and received gestures, activities, or other tangible stimuli. The invention has wide applications, including long-distanced voice communication, remote collaboration, audio augmentation, VR and AR augmentation, and other digital, remote, or immersive applications or scenarios.

Further, a haptic-feedback bilateral human-machine interaction method based on remote digital interaction as claimed in claim 1, wherein the CPUs used in the S1, S2, S3, and S4 acquire audio sources through a wireless communication module.

Further, a haptic-feedback bilateral human-machine interaction method based on remote digital interaction as claimed in claim 1, wherein the haptic-feedback bilateral human-machine interaction method based on remote digital interaction is equipped with a perceivable tangible user interface and a human-machine interaction module.

Further, a haptic-feedback bilateral human-machine interaction method based on remote digital interaction as claimed in claim 3, wherein the perceivable tangible user interface is a user interaction interface controlled by a control unit, to activate an array of actuators to provide haptic, tactile and kinesthetic stimulations, through mapping of haptic, tactile, and kinesthetic feedback signals from the tactile and kinesthetic feedback semantic database, and the translation of haptic, tactile, and kinesthetic representations.

Further, a haptic-feedback bilateral human-machine interaction method based on remote digital interaction as claimed in claim 3, wherein the human-machine interaction module is used to receive user gesture commands provided by the touch panel; and the touch panel monitors the user's input gestures in real-time and transmits the acquired gesture data to the control unit, and the control unit converts the gesture command data into device control commands to control the control unit and the CPU to execute corresponding control functions.

4. BRIEF DESCRIPTION OF ACCOMPANY DRAWINGS

5. SPECIFIC EMBODIMENT OF THE INVENTION

To make the invention more comprehensible, exemplary embodiments according to the application are described below in detail with reference to the accompanying drawings.

Figure 1:
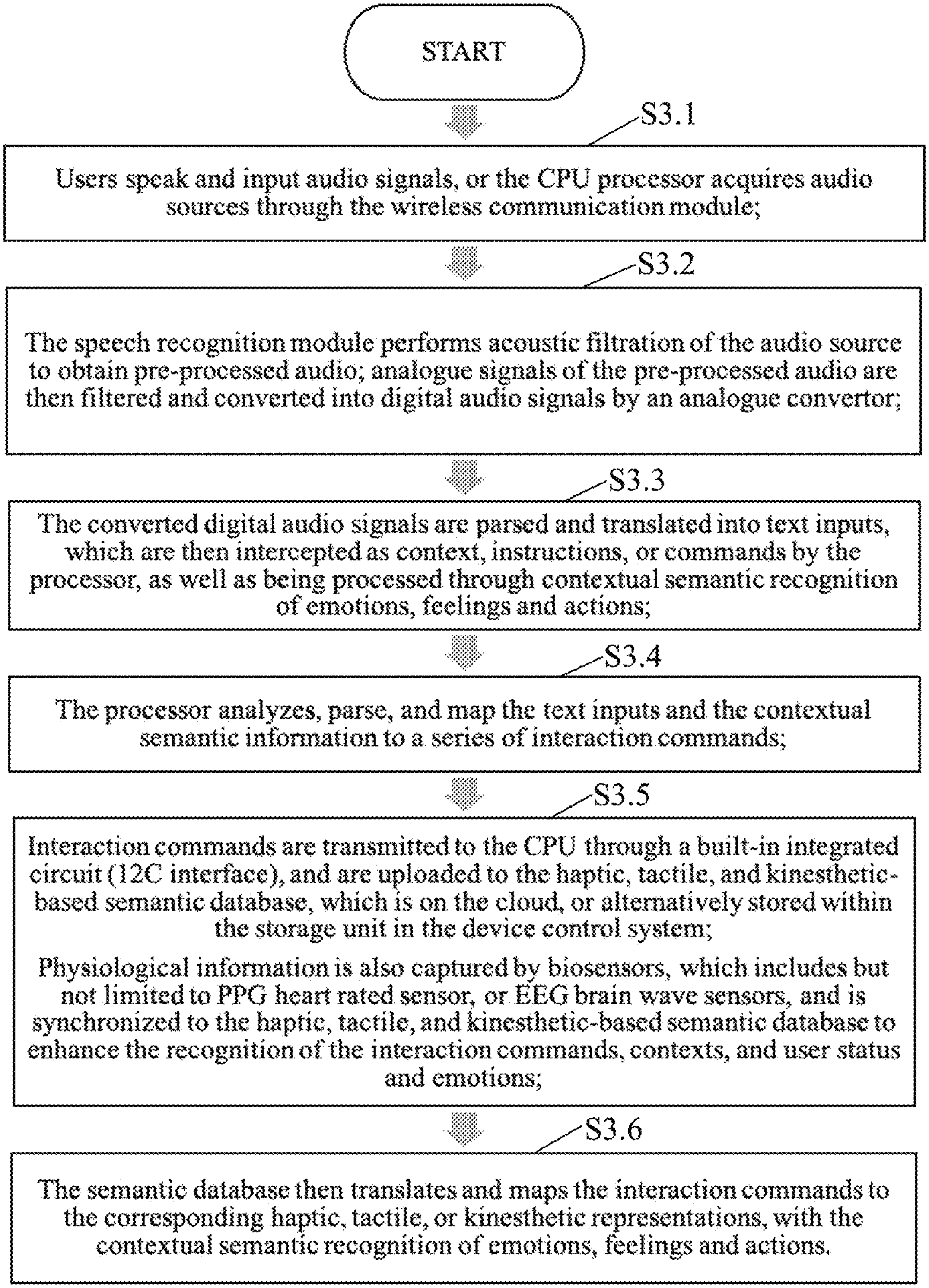
FIG. 1 is a schematic diagram showing the input method S1 of the invention.
Figure 2:
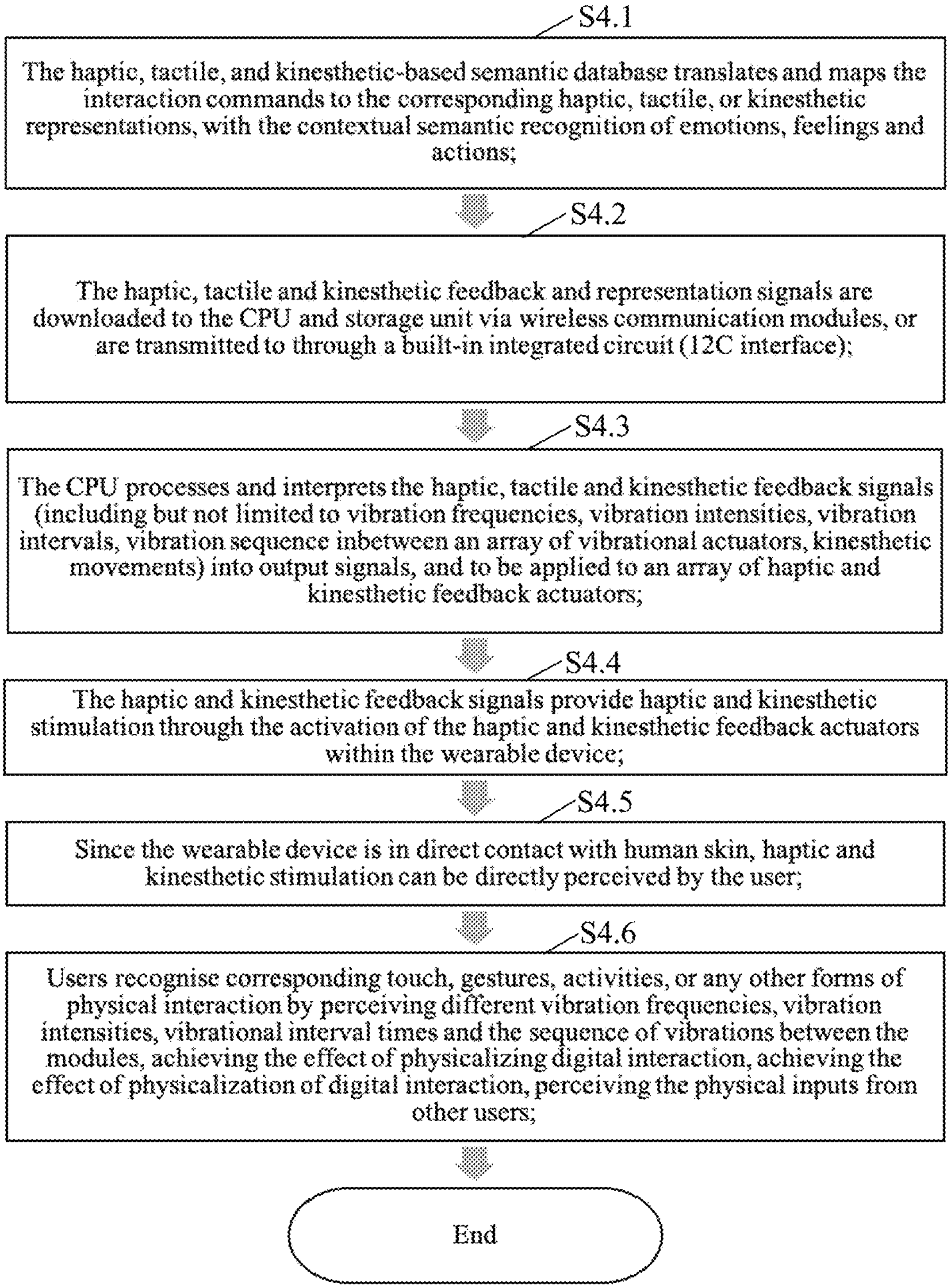
FIG. 2 is a schematic diagram showing the input method S2 of the invention.
Figure 3:
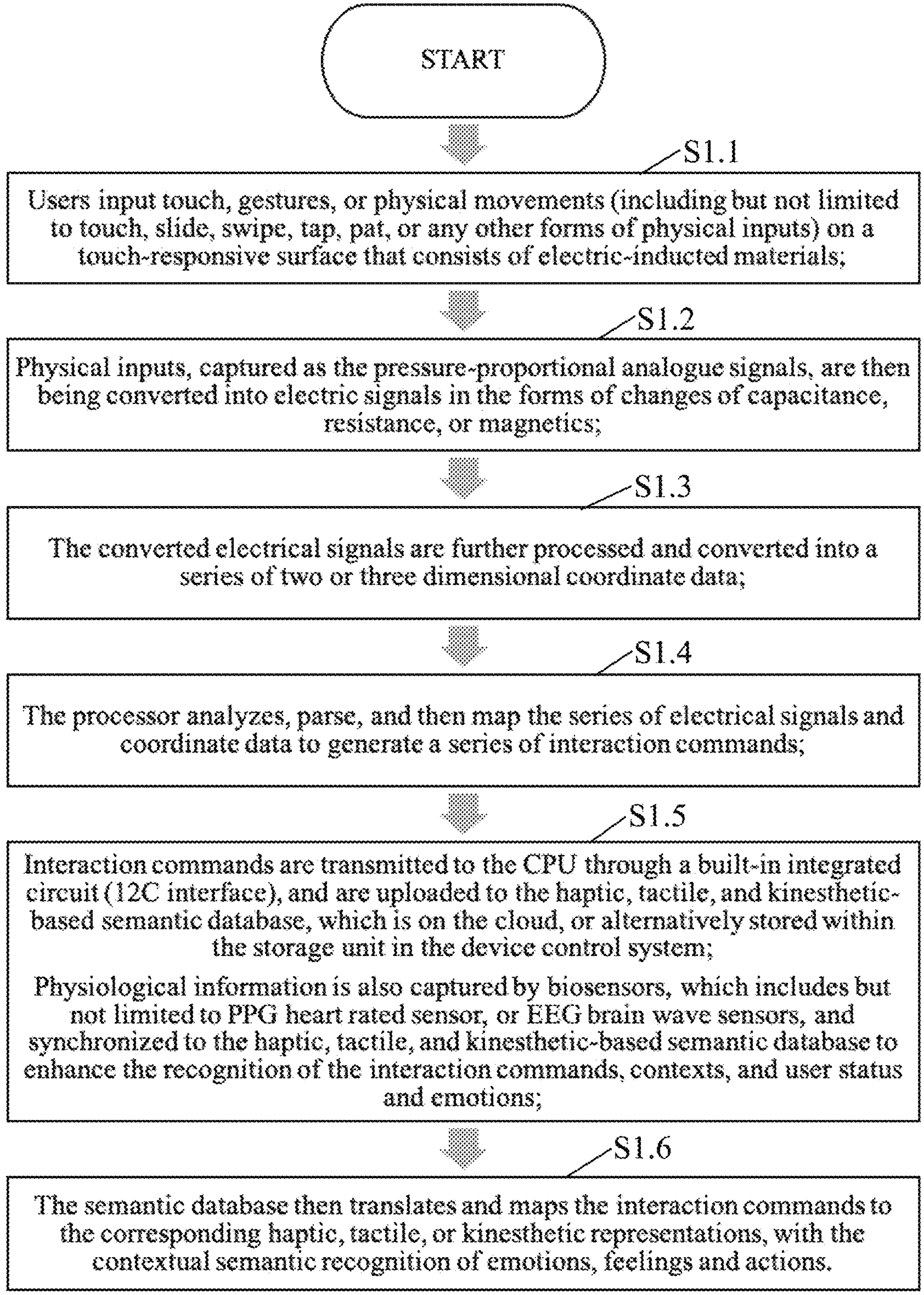
FIG. 3 is a schematic diagram showing the input method S3 of the invention.
Figure 4:
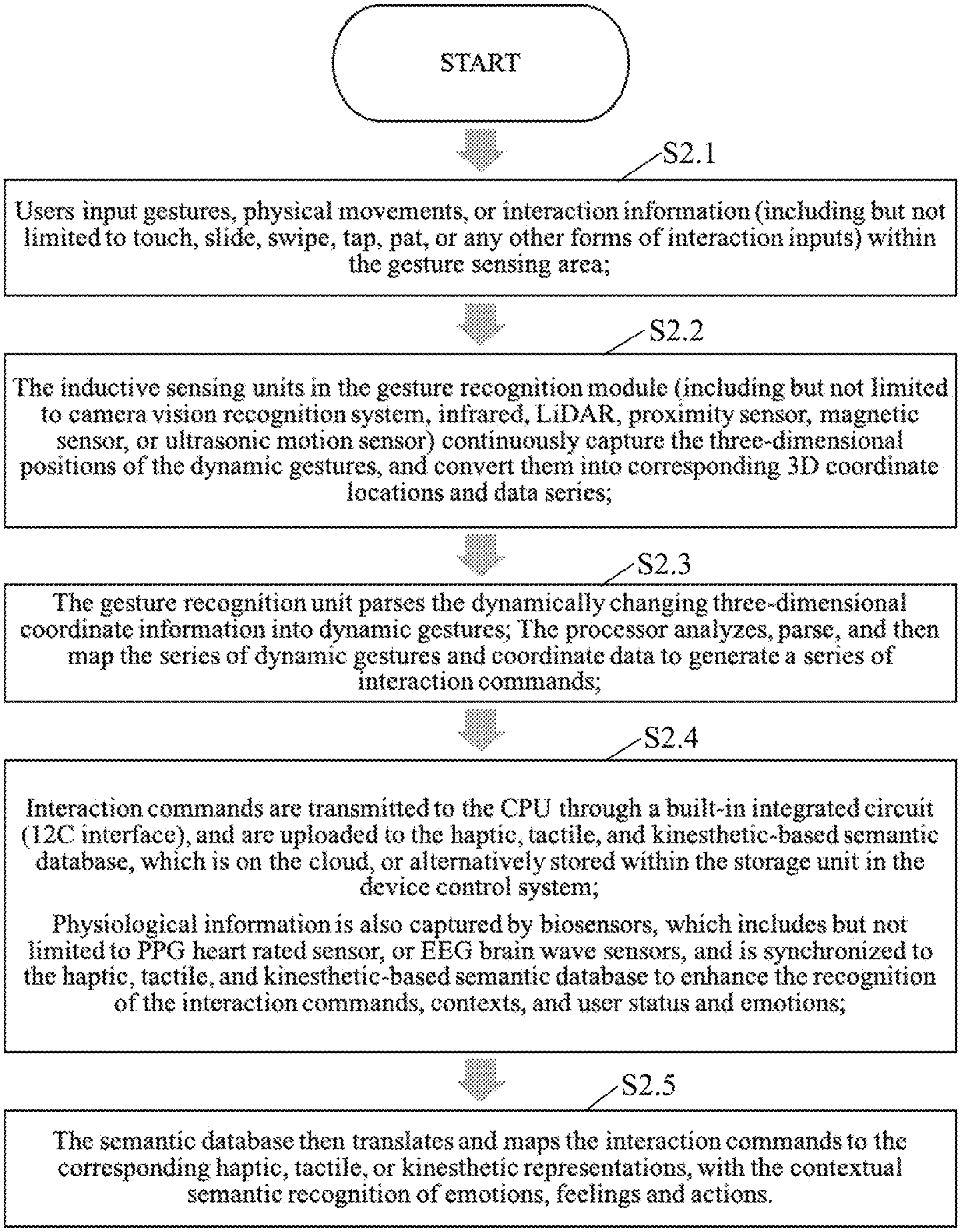
FIG. 4 is a schematic diagram showing the output and interaction method S4 of the invention.

In the specific embodiments of the invention, as shown in the embodiment of FIGS. 1 to 3, the embodiments provide a haptic-feedback bilateral human-computer interaction method based on remote digital interaction, comprising the following steps:

S1. Touch Recognition

S1.1. To start, users input touch, gestures, or physical movements (including but not limited to touch, slide, swipe, tap, pat, or any other forms of physical inputs) on a touch-responsive surface that consists of electric-inducted materials;

S1.2. Physical inputs, captured as the pressure-proportional analogue signals, are then being converted into electric signals in the forms of changes of capacitance, resistance, or magnetics;

S1.3. The converted electrical signals are further processed and converted into a series of two- or three-dimensional coordinate data;

S1.4. The processor analyzes, parse, and then map the series of electrical signals and coordinate data to generate a series of interaction commands;

S1.5. Interaction commands are transmitted to the CPU through a built-in integrated circuit (12C interface), and are uploaded to the haptic, tactile, and kinesthetic-based semantic database, which is on the cloud, or alternatively stored within the storage unit in the device control system; Physiological information is also captured by biosensors, which includes but not limited to PPG heart rated sensor, or EEG brain wave sensors, and synchronized to the haptic, tactile, and kinesthetic-based semantic database to enhance the recognition of the interaction commands, contexts, and user status and emotions;

S1.6. The semantic database then translates and maps the interaction commands to the corresponding haptic, tactile, or kinesthetic representations, with the contextual semantic recognition of emotions, feelings and actions.

S2. Gesture Recognition

S2.1. To start: users input gestures, physical movements, or interaction information (including but not limited to touch, slide, swipe, tap, pat, or any other forms of interaction inputs) within the gesture sensing area;

S2.2. The inductive sensing units in the gesture recognition module (including but not limited to camera vision recognition system, infrared, LiDAR, proximity sensor, magnetic sensor, or ultrasonic motion sensor) continuously capture the three-dimensional positions of the dynamic gestures, and convert them into corresponding 3D coordinate locations and data series;

S2.3. The gesture recognition unit parses the dynamically changing three-dimensional coordinate information into dynamic gestures; the processor analyzes, parse, and then map the series of dynamic gestures and coordinate data to generate a series of interaction commands;

S2.4. Interaction commands are transmitted to the CPU through a built-in integrated circuit (12C interface), and are uploaded to the haptic, tactile, and kinesthetic-based semantic database, which is on the cloud, or alternatively stored within the storage unit in the device control system;

Physiological information is also captured by biosensors, which includes but not limited to PPG heart rated sensor, or EEG brain wave sensors, and is synchronized to the haptic, tactile, and kinesthetic-based semantic database to enhance the recognition of the interaction commands, contexts, and user status and emotions;

S2.5. The semantic database then translates and maps the interaction commands to the corresponding haptic, tactile, or kinesthetic representations, with the contextual semantic recognition of emotions, feelings and actions.

S3. Voice Recognition

S3.1. Users speak and input audio signals, or the CPU processor acquires audio sources through the wireless communication module;

S3.2. The speech recognition module performs acoustic filtration of the audio source to obtain pre-processed audio; analogue signals of the pre-processed audio are then filtered and converted into digital audio signals by an analogue convertor;

S3.3. The converted digital audio signals are parsed and translated into text inputs, which are then intercepted as context, instructions, or commands by the processor, as well as being processed through contextual semantic recognition of emotions, feelings and actions;

S3.4. The processor analyzes, parse, and map the text inputs and the contextual semantic information to a series of interaction commands;

S3.5 Interaction commands are transmitted to the CPU through a built-in integrated circuit (12C interface), and are uploaded to the haptic, tactile, and kinesthetic-based semantic database, which is on the cloud, or alternatively stored within the storage unit in the device control system; Physiological information is also captured by biosensors, which includes but not limited to PPG heart rated sensor, or EEG brain wave sensors, and is synchronized to the haptic, tactile, and kinesthetic-based semantic database to enhance the recognition of the interaction commands, contexts, and user status and emotions;

S3.6 The semantic database then translates and maps the interaction commands to the corresponding haptic, tactile, or kinesthetic representations, with the contextual semantic recognition of emotions, feelings and actions.

S4. Interaction

S4.1. To start: The haptic, tactile, and kinesthetic-based semantic database translates and maps the interaction commands to the corresponding haptic, tactile, or kinesthetic representations, with the contextual semantic recognition of emotions, feelings and actions;

S4.2. The haptic, tactile and kinesthetic feedback and representation signals are downloaded to the CPU and storage unit via wireless communication modules, or are transmitted to through a built-in integrated circuit (12C interface);

S4.3. The CPU processes and interprets the haptic, tactile and kinesthetic feedback signals (including but not limited to vibration frequencies, vibration intensities, vibration intervals, vibration sequence in between an array of vibrational actuators, kinesthetic movements) into output signals, and to be applied to an array of haptic and kinesthetic feedback actuators;

S4.4. The haptic and kinesthetic feedback signals provide haptic and kinesthetic stimulation through the activation of the haptic and kinesthetic feedback actuators within the wearable device;

S4.5. Since the wearable device is in direct contact with human skin, haptic and kinesthetic stimulation can be directly perceived by the user;

S4.6. Users recognize corresponding touch, gestures, activities, or any other forms of physical interaction by perceiving different vibration frequencies, vibration intensities, vibrational interval times and the sequence of vibrations between the modules, achieving the effect of physicalizing digital interaction, achieving the effect of physicalization of the digital interactions, perceiving the physical inputs from other users; and concluding the interaction process.

In an embodiment of the invention, as shown in FIGS. 1 to 4, the invention has the following working principle: the technical solution comprises a haptic, tactile, and kinesthetic feedback semantic database. The tactile and kinesthetic semantic database is a rule information database for mapping interactive actions and haptic and tactile and kinesthetic feedback signals with each other, including but not limited to decomposing various interactive actions into step-by-step actions and simulating the decomposed step-by-step actions into mechanical commands that can be applied to haptic, tactile and kinesthetic actuators, or converted into electric signals in the forms of capacitive, resistant, or magnetic data, or three-dimensional coordinates that can be sensed by touch or gesture recognition sensing modules, aiming to identify different interactive actions of the input end (action inputter) through the mapping rules of the semantic database, and mechanically simulate the interactive action at the output end through haptic, tactile or kinesthetic actuators.

Giving an example of realization, 'stroking' or 'touching' action can be mapped to an array of haptic feedback actuators as 'a series of commands to sequentially complete a cycle of 'turn on', 'low vibration frequency and intensity', 'short vibration duration', 'turn off' with a single haptic feedback actuator as an unit and all units are positioned in a linear arrangement', until each haptic feedback actuator completes the instructions for a sequence cycle and repeats this sequence several times, aiming to decompose and simulate the motion characteristics of 'stroking', or the action can be mapped to 'a kinesthetic deformable generator as 'a series of commands to sequentially complete a cycle of 'turn on', 'ascend/protrude', 'maintain position for a short period of time', 'descend/shrink', 'turn off' with a single kinesthetic deformable generator as an unit and all units are positioned in a linear arrangement', until each kinesthetic deformation generators completes the command for a sequence cycle and repeats this sequence several times. Other interactions, physical inputs, or emotions can also refer to the principle, such as 'missing/longing' or 'touched' can be mapped to the haptic representation of 'heartbeat', which simulates the vibration frequency or kinesthetic deformation frequency to heart beats, to associate haptic, tactile and kinesthetic feedback with perceivable representations that general public can recognize.

In an embodiment of the invention, as shown in FIG. 1 to FIG. 4, a haptic-feedback bilateral human-machine interaction method that physicalize digital interactions is equipped with a 'Tangible User Interface' and a human-computer interaction module.

In an embodiment of the invention, as shown in FIG. 1 to FIG. 4, the 'Tangible User Interface' is a user interaction interface controlled by the control unit and provides haptic, tactile and kinesthetic stimulation through mapping haptic, tactile and kinesthetic feedback signals to corresponding representations, following the principle guided by the 'tactile and kinesthetic feedback semantic database'. Wherein, the 'Tangible User Interface (TUI)' is a user interaction interface controlled by control unit and provides haptic, tactile and kinesthetic stimulation (including but not limited to, vibration stimulation from vibration motor as a single unit or in an array arrangement) through a series of haptic, tactile and kinesthetic feedback signals mapped and guided by the 'tactile and kinesthetic feedback semantic database' to activate the actuator module (including but not limited to, vibration stimulation from vibration motor as a single unit or in an array arrangement). As the wearable device is in direct contact with user's skin, the transmitted haptic, tactile and kinesthetic stimulation can be directly perceived by the user; wherein the vibration feedback and stimulation can stimulate either singular or multiple vibrational stimulation from either singular actuator module, or a series of actuator modules in array arrangement, and the vibration time, vibration interval, vibration sequence, and other parameters can be adjusted to correspond to different mapping targets.

In an embodiment of the invention, as shown in FIG. 1 to FIG. 4, the human-computer interaction module receives user gesture and touch commands, or other physical inputs through touch responsive panel, wherein the touch responsive panel monitors the user's input gestures in real time, and transmits the obtained gesture data to the control unit, the control unit converts the gesture command data into device control commands to control the control unit and CPU processor to execute corresponding control functions.

In an embodiment of the invention, as shown in FIG. 1 to FIG. 4, the control commands and control functions include but are not limited to any one or more of the following: transmission of haptic, tactile and kinesthetic feedback signal commands, actuating the haptic, tactile and kinesthetic actuator array, audio transmission, playback control, voice communication, device switches, volume adjustment, device status setting, as well as other functions.

In an embodiment of the invention, as shown in FIG. 1 to FIG. 4, a haptic-feedback bilateral human-machine interaction method that physicalize digital interactions further comprises a heart rate sensor for real-time detection of the user's heart rate data and/or a EEG sensor for real-time detection of the user's brainwaves; wherein the heart rate sensor is connected to the CPU processor through the I2C interface, optically detecting the periodic changes in the intensity of the reflected light from the user's capillary blood, calculating the user's heart rate when wearing the device, and transmitting the obtained heart rate data to the CPU processor. The control unit on the CPU processor interprets the heart rate data and brainwave data and processes the data according to the relevant algorithm to predict the user's emotions to enhance the comprehension of contextual meaning and semantics of the conversation, augment the interpretation of emotions as well as other multimodal human senses, and improve the mapping accuracy of the haptic, tactile and kinesthetic feedback. Wherein, the contact sensor (including but not limited to infrared or proximity sensor) is connected to the CPU through internal wiring and I2C interface in the device. When the contact sensing function of the device is enabled, the contact sensor can detect the wearing position and the contact of the device with the skin in real time and transmit the detected contact data to the CPU. The control unit is regarded as the operating system on the CPU, which can interpret the wearing state of the device to determine whether to enable or to disable the operation of the haptic, tactile and kinesthetic actuators.

In an embodiment of the invention, as shown in FIG. 1 to FIG. 4, the solution covers voice communication, audio playback, haptic, tactile and kinesthetic stimulation (including but not limited to vibrational stimulation), corresponding control system, and other functions. The unique 'haptic, tactile and kinesthetic feedback semantic database' and 'Tangible User Interface' can map touch, gesture, voice and audio inputs to corresponding perceptible haptic representations.

In an embodiment of the invention, as shown in FIG. 1 to FIG. 4, the invention generally relates to the technology of physicalization of digital interaction to introduce haptic, tactile and kinesthetic feedback in traditional human-machine interaction. More specifically, the invention relates to an apparatus for mapping and converting touch, gesture, voice and audio inputs and information into corresponding perceptible haptic feedback and stimulations in real time guided by the mapping principles identified in the 'haptic, tactile and kinesthetic feedback semantic database' and realized or actuated through a single actuator or actuators in array arrangement.

In an embodiment of the invention, as shown in FIG. 1 to FIG. 4, the surround haptic feedback and stimulation forms bidirectional parallel communication which is a dual-layers interface that enables the transmission of audio and haptic/tactile/kinesthetic feedback to enhance the comprehension of contextual meaning and semantics of the conversation, augment the interpretation of emotions as well as other multimodal human senses in communication. The invention has wide applications, including long-distanced voice communication, remote collaboration, audio augmentation, VR and AR augmentation, and other digital, remote, or immersive applications or scenarios.

The basic principles, main characteristics and advantages of the invention are described hereinabove. It should be understood by those skilled in the art that the description of above embodiments is not restrictive, and what is shown in the embodiments and specification is only one of the embodiments and principles of the invention, and the actual structure is not limited thereto. In summary, various modifications and improvements based on the technical solution without departing from the inventive purpose of the invention made by inspired ordinary technicians in the art without creative efforts shall all fall within the protection scope of the invention. It is intended that the scope of the invention be defined by the claims appended hereto and their equivalents.

What is claimed is:

1. A haptic-feedback bilateral human-machine interaction method that enables the physicalization of remote digital interaction, wherein the interaction commands are processed to generate corresponding haptic, tactile, and/or kinesthetic feedback signals determined based on interpreted contextual meaning derived from the interaction commands and contextual information, wherein the interpreted contextual meaning is used to determine the form of the haptic, tactile, and/or kinesthetic output signals, and comprises three input methods S1, S2, and S3, and one output and interaction implementation method S4, wherein specifically comprises:

S1. Touch Recognition:

S1.1. To start, users input touch, gestures, touch, slide, swipe, tap, pat, or other forms of physical inputs and movements on a touch-responsive surface that consists of electric-inducted materials;

S1.2. Physical inputs, captured as the pressure-proportional analogue signals, are then being converted into electric signals in the forms of changes of capacitance, resistance, or magnetics;

S1.3. The converted electrical signals are further processed and converted into a series of two- or three-dimensional coordinate data;

S1.4. A CPU processor analyzes, parse, and then map the series of electrical signals and coordinate data to generate a series of interaction commands;

S1.5. Interaction commands are transmitted to a Central Processing Unit (CPU) through a built-in integrated circuit, and are uploaded to a haptic, tactile, and kinesthetic-based semantic database, which is on a cloud, or alternatively stored within a storage unit in a device control system; Physiological information is also captured by biosensors, which includes but not limited to Photoplethysmography (PPG) heart rated sensor, or Electroencephalogram (EEG) brain wave sensors, and synchronized to the haptic, tactile, and kinesthetic-based semantic database to enhance the recognition of the interaction commands, contexts, and user status and emotions;

S1.6. The semantic database then translates and maps the interaction commands to the corresponding haptic, tactile, or kinesthetic representations, with the contextual semantic recognition of emotions, feelings and actions;

S2. Gesture Recognition;

S2.1. To start: users input gestures, physical movements, touch, slide, swipe, tap, pat, or other forms of interaction inputs within a gesture sensing area;

S2.2. Inductive sensing units in a gesture recognition module, involving camera vision recognition system, or infrared, LiDAR, or proximity sensor, or magnetic sensor, or ultrasonic motion sensor, continuously capture the three-dimensional positions of the dynamic gestures, and convert them into corresponding 3D coordinate locations and data series;

S2.3. the CPU processor analyzes, parse, and then map the series of dynamic gestures and coordinate data to generate a series of interaction commands;

S2.4. Interaction commands are transmitted to the CPU through a built-in integrated circuit, and are uploaded to the haptic, tactile, and kinesthetic-based semantic database, which is on the cloud, or alternatively stored within the storage unit in the device control system;

Physiological information is also captured by biosensors, which includes but not limited to PPG heart rated sensor, or EEG brain wave sensors, and is synchronized to the haptic, tactile, and kinesthetic-based semantic database to enhance the recognition of the interaction commands, contexts, and user status and emotions;

S2.5. The semantic database then translates and maps the interaction commands to the corresponding haptic, tactile, or kinesthetic representations, with the contextual semantic recognition of emotions, feelings and actions;

S3. Voice Recognition;

S3.1. Users speak and input audio signals, or a CPU processor acquires audio sources through a wireless communication module;

S3.2. analogue signals of the pre-processed audio are then filtered and converted into digital audio signals by an analogue convertor;

S3.3. The converted digital audio signals are parsed and translated into text inputs, which are then intercepted as context, instructions, or commands by the CPU processor, as well as being processed through contextual semantic recognition of emotions, feelings and actions;

S3.4. The CPU processor analyzes, parse, and map the text inputs and the contextual semantic information to a series of interaction commands;

S3.5 Interaction commands are transmitted to the CPU through a built-in integrated circuit, and are uploaded to the haptic, tactile, and kinesthetic-based semantic database, which is on the cloud, or alternatively stored within the storage unit in the device control system; Physiological information is also captured by biosensors, which includes but not limited to PPG heart rated sensor, or EEG brain wave sensors, and is synchronized to the haptic, tactile, and kinesthetic-based semantic database to enhance the recognition of the interaction commands, contexts, and user status and emotions;

S3.6 The semantic database then translates and maps the interaction commands to the corresponding haptic, tactile, or kinesthetic representations, with the contextual semantic recognition of emotions, feelings and actions;

S4. Interaction;

S4.1. To start: The haptic, tactile, and kinesthetic-based semantic database translates and maps the interaction commands to the corresponding haptic, tactile, or kinesthetic representations, with the contextual semantic recognition of emotions, feelings and actions;

S4.2. The haptic, tactile and kinesthetic feedback and representation signals are downloaded to the CPU and storage unit via wireless communication modules, or are transmitted to through a built-in integrated circuit;

S4.3. The CPU processes and interprets the haptic, tactile and kinesthetic feedback signals (including but not limited to vibration frequencies, vibration intensities, vibration intervals, vibration sequence in between an array of vibrational actuators, kinesthetic movements) into output signals, and to be applied to an array of haptic and kinesthetic feedback actuators;

S4.4. The haptic and kinesthetic feedback signals provide haptic and kinesthetic stimulation through the activation of the haptic and kinesthetic feedback actuators within a wearable device;

S4.5. Since the wearable device is in direct contact with human skin, haptic and kinesthetic stimulation can be directly perceived by the user;

S4.6. Users recognize corresponding touch, gestures, activities, or any other forms of physical interaction by perceiving different vibration frequencies, vibration intensities, vibrational interval times and the sequence of vibrations between modules, achieving the effect of physicalizing digital interaction, achieving the effect of physicalization of the digital interactions, perceiving the physical inputs from other users; and concluding the interaction process.

2. A haptic-feedback bilateral human-machine interaction method based on remote digital interaction as claimed in claim 1, wherein the CPU processors used in the S1, S2, S3, and S4 acquire and process audio sources through a wireless communication module.

3. A haptic-feedback bilateral human-machine interaction method based on remote digital interaction as claimed in claim 1, wherein the haptic-feedback bilateral human-machine interaction method based on remote digital interaction is equipped with a perceivable tangible user interface and a human-machine interaction module.

4. A haptic-feedback bilateral human-machine interaction method based on remote digital interaction as claimed in claim 3, wherein the perceivable tangible user interface is a user interaction interface controlled by a control unit, to activate a single actuator or actuators in array arrangement to provide haptic, tactile and kinesthetic stimulations, through mapping of haptic, tactile, and kinesthetic feedback signals from the tactile and kinesthetic feedback semantic database, and the translation of haptic, tactile, and kinesthetic representations including singular or multiple vibrational stimulation from either singular actuator module, or a series of actuator modules in array arrangement, and the vibration time, vibration interval, vibration sequence, and other parameters.

5. A haptic-feedback bilateral human-machine interaction method based on remote digital interaction as claimed in claim 3, and the touch panel monitors the user's input gestures in real-time and transmits the acquired gesture data to a control unit.

* * * * *